(12) United States Patent
Wright et al.

(10) Patent No.: US 6,500,298 B1
(45) Date of Patent: Dec. 31, 2002

(54) STRIPPING MACHINE AND METHOD

(76) Inventors: Kevin P. Wright, 620 Knob Creek Rd., Wartrace, TN (US) 37183; T. Allen Wright, 4513 Hwy. 64 East, Wartrace, TN (US) 37183

( * ) Notice: Subject to any disclaimer, the term of this patent is extended or adjusted under 35 U.S.C. 154(b) by 0 days.

(21) Appl. No.: 09/483,116

(22) Filed: Jan. 14, 2000

(51) Int. Cl.[7] ............................................. B32B 35/00
(52) U.S. Cl. ........................................ 156/344; 156/584
(58) Field of Search ............................... 156/344, 584; 271/280, 281, 282, 283, 284, 285

(56) References Cited

U.S. PATENT DOCUMENTS

| | | | |
|---|---|---|---|
| 2,337,724 A | | 12/1943 | Mackie |
| 4,274,676 A | | 6/1981 | Chapel |
| 4,724,032 A | * | 2/1988 | Kay ........................ 156/344 |
| 4,770,737 A | | 9/1988 | Seki |
| 4,867,836 A | | 9/1989 | Hamamura et al. |
| 5,000,816 A | * | 3/1991 | Seki et al. .................. 156/584 |
| 5,110,393 A | * | 5/1992 | Sumi et al. .................. 156/344 |
| 5,277,738 A | * | 1/1994 | Moser et al. ............ 156/308.2 |
| 5,358,591 A | | 10/1994 | Candore |
| 5,540,809 A | * | 7/1996 | Ida et al. ................. 156/344 X |
| 5,662,762 A | | 9/1997 | Ranalli |

* cited by examiner

*Primary Examiner*—Mark A. Osele
(74) *Attorney, Agent, or Firm*—Dority & Manning, P.A.

(57) ABSTRACT

Apparatus and method for the automatic removal of a protective cover from a planar sheet. Air under pressure is directed angularly from an air nozzle system at the cover to partially dislodge same and to force a portion of the cover into contact with a rotating roll. The portion of the cover in contact with the roll is held thereby until presented to the force of suction at an entrance to a suction duct. The cover is carried away by air currents in the duct after the cover and is fully stripped from the sheet.

27 Claims, 4 Drawing Sheets

STRIPPING MACHINE AND METHOD

BACKGROUND OF THE INVENTION

The present invention relates to an apparatus and method for automatic stripping and removal of a protective film from a planar substrate and particularly from a polymer sheet such as plexiglass and the like.

Polymeric sheets, for example, have historically been utilized in fabrication of various and sundry structures. Typically, such sheets are provided to a fabricator as planar sheets of a certain size which must be cut to a predetermined size and shape as needed for a particular fabrication process. Exemplary of polymer sheets of the type being discussed herein are polymethylmethacrylate sheets which are sometimes referred to as plexiglass. During fabrication, the sheets may be cut, milled, shaped, drilled and otherwise manipulated to facilitate fabrication of an intended structure. After working the sheet(s), to the desired size and shape, these sheets are used in fabrication of the intended article. Just by way of example, and without limitation, many display supports of various and sundry sizes and shapes are fabricated from such polymeric sheets. Often in use of the structures fabricated from the polymeric sheets, smooth transparent surfaces add to the aesthetic or functional qualities of the structure.

Typically, the planar sheets of the polymeric materials have an optical quality of transparency. However, due to softness of the surfaces of the sheets, the sheets are easily scratched or otherwise deformed, detracting from the conventional optical qualities of the sheets, and ultimately therefor the aesthetics of the structures fabricated therefrom. Consequently, in order to protect the polymeric sheets against scratching and the like, a protective flexible film or cover is routinely secured along opposite sides of the sheet and normally remains in place until the sheet is used in fabrication of the intended structure, or even in some cases after the structure is produced and until the product is ready for its intended use.

In the past, though some machines have been developed to remove protective covers, there has been a general industry practice of manual removal of the protective covers from the sheets at the appropriate time. Manual removal of the protective covers from the polymeric sheets, as would be expected, is labor intensive, and therefore not desirable.

Similarly, in the electronics field, printed circuits, in some instances, have a protective film cover provided across one or both sides of the circuit being produced which must be stripped during or prior to the process for manufacture of the printed circuit board. Particularly in a process where a portion of the board is photographically processed to achieve a particular functional element of the circuit, protective covers are employed. In this industry, machines also have been previously developed for automatically removing the protective film cover from the printed circuit boards.

Exemplary of prior art efforts directed to removal of protective covers from planar substrates are U.S. Pat. Nos. 2,337,724; 4,274,676; 4,724,032; 4,770,733; 4,867,836; 5,358,591; and 5,662,762.

The present invention represents an improvement over the apparatus and processes described in the above prior art patents. Particularly, it is submitted that the present invention is patentable over the above listed prior art patents taken either alone or in combination.

SUMMARY OF THE INVENTION

It is an object of the present invention to provide apparatus for the automatic removal of protective cover from polymeric or other sheets.

Another object of the present invention is to provide an improved apparatus for the automatic removal of a protective layer from a substrate.

Still another object of the present invention is to provide an improved apparatus for the automatic removal of an outer film layer from a planar polymeric substrate.

Still further another object of the present invention is to provide an improved method for the automatic removal of a protective film from a substrate.

Yet another object of the present invention is to provide an improved method for the removal of a flexible film layer from one or both sides of a polymeric sheet.

Generally speaking, apparatus according to the present invention comprises a conveyor arrangement for engaging and moving a sheet having a protective cover on one or both sides of same along a predetermined path; an air nozzle system located along a continuation of said path for said sheet and being disposed at a predetermined angular relationship with respect to a sheet passing along said path for directing gas under pressure against said protective cover adequate to partially dislodge said cover from said side of said sheet; a driven roll located proximate said air nozzle system and said path, said roll having a capability for receiving and holding a portion of protective cover dislodged from said surface for further removal of same as said sheet passes thereby; and a suction system located adjacent said roll for receiving said protective cover from said roll and transporting said protective cover away.

More specifically, apparatus according to a preferred embodiment of the present invention includes a pair of opposed driven belts that define a passageway therebetween, preferably adjustable, for a planar sheet and cooperate with the planar sheet therebetween to move same along said passageway which is an intended path of travel. A plurality of air jets are angularly disposed with respect to a continuation of the path followed by the sheet for directing air under pressure against the cover to initially and partially dislodge the cover so that the cover can be completely removed from said sheet. A suction duct is located along the path, adjacent the air nozzles with a driven roll in close proximity to the air nozzles for receiving a portion of the cover as it is dislodged from the sheet and transporting the dislodged portion of the cover and presenting same to the effects of suction in the suction duct so that when the cover is fully dislodged from the sheet the cover is carried away by the force of suction in the duct. A second conveyor may be provided for movement of the sheet away from the air jets.

Generally speaking, the method according to the present invention for removing a protective cover from a planar substrate comprises the steps of transporting a sheet with a protective cover thereon along an intended path of travel; directing air under pressure at a predetermined angle to said path against said cover to dislodge a portion of said cover from said sheet; engaging a portion of said cover dislodged from said sheet with a driven roll and continuing gradual removal of said cover; presenting said portion of said cover to the effects of a source of suction adequate to hold said portion and transport said cover away after said cover is completely removed from said sheet.

More specifically, according to a preferred embodiment of the present invention, a planar substrate having a protective film cover on opposite sides of same is fed under controlled conditions to a stripping station where air under pressure is directed at a predetermined angle with respect to the interface between the substrate and the protective cover and partially dislodges the film from the sheet. The partially dislodged film is forced by the air against a driven roll located closely proximate the nozzles and the sheet. The driven roll grabs and holds the cover and as the roll rotates continues to remove the cover from the sheet and present the cover to the effects of a source of suction. The removed cover is then transported away by the suction and the sheet, now stripped, is conveyed away from the stripping area.

BRIEF DESCRIPTION OF THE DRAWINGS

A full and enabling disclosure of the present invention, including the best mode thereof, directed to one of ordinary skill in the art, is set forth in the remainder of the specification, which makes reference to the appended figures in which.

Figure 1:
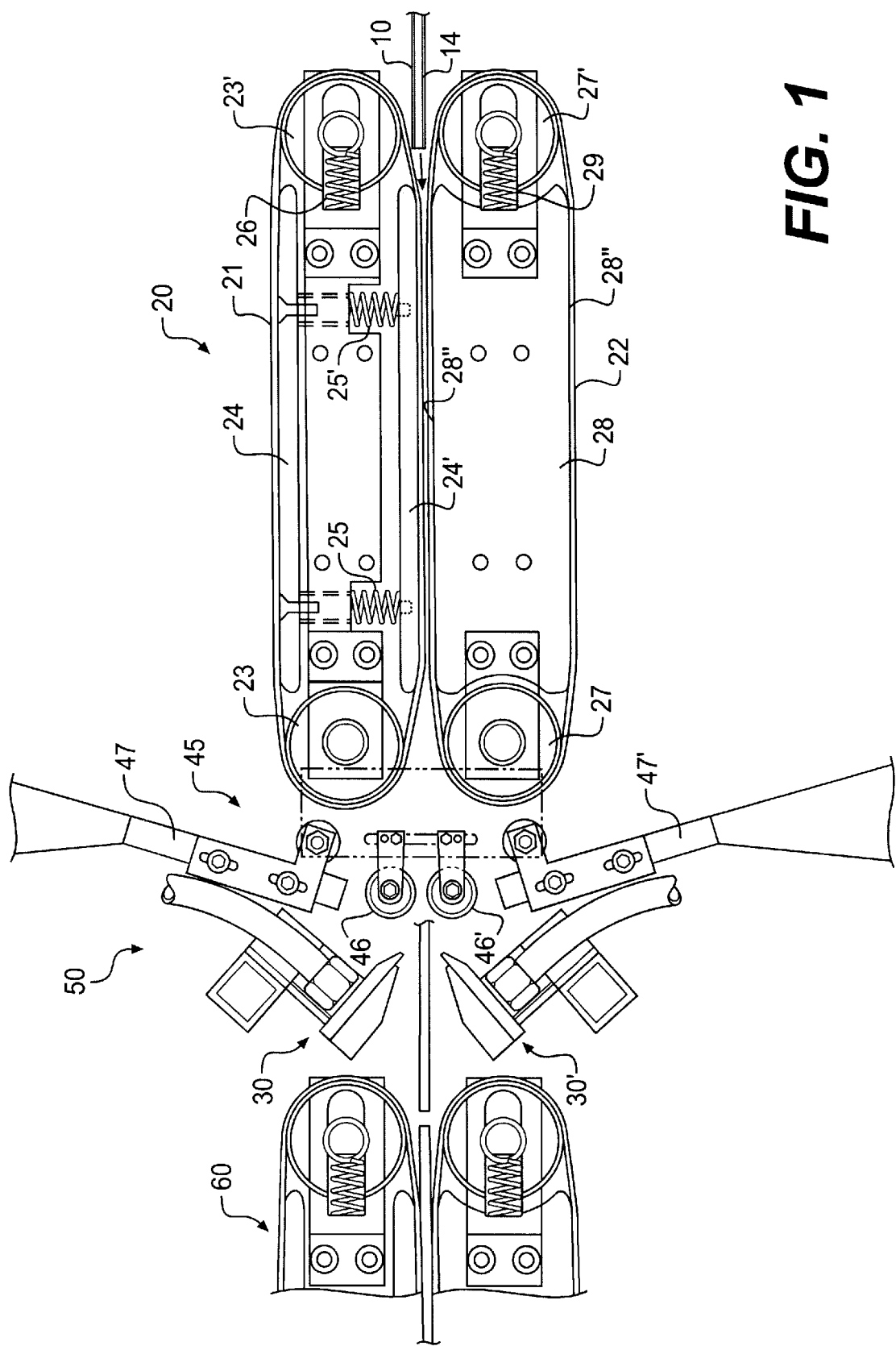
FIG. 1 is a top plan view of a portion of apparatus according to teachings of the present invention.

Repeat use of reference characters throughout the present specification and appended drawings is intended to represent same or analogous features or elements of the invention.

DETAILED DESCRIPTION OF PREFERRED EMBODIMENTS

Making reference to the Figures, preferred embodiments of the present invention will now be described in detail.

Referring to FIG. 1, apparatus according to teachings of the present invention includes a sheet feeding and controlling section generally indicated as 20 through which a substrate generally 10 is transported. Substrate 10 includes a base or sheet 12 to which a protective cover 14, normally a film, is secured to one on both sides. Typically, according to the present invention, sheet 12 is a polymer sheet, exemplified by polymethylmethacrylate, with a polymeric film cover 14 provided over the entirety of both outer surfaces of same, leaving the peripheral edges of base 12 uncovered. Protective films 14 are generally secured to base 12 by a static or electrical attraction and removal of same is ultimately intended.

A substrate 10 being stripped of its protective film cover (s) 14 is fed from control feed section 20 to a film stripping section generally 50 where the protective film(s) or cover(s) are automatically removed from sheet 12. From stripping section 50, sheets 12 (now with cover(s) 14 removed) are received by an exit feed section generally 60 which transports sheets 12 away from stripping section 50.

In the following description, a base or sheet 12 with a protective cover 14 on both sides of same is discussed by way of example only and not by way of limitation.

Control feed section 20 preferably includes a pair of opposing conveyor belts 21, 22 oriented face to face for frictional engagement with a substrate 10 passing therebetween. As illustrated in FIG. 1, belt 21 is received about two pulleys 23, 23' with pulley 23 being driven and pulley 23' being an idler pulley. Pulleys 23 and 23' are journaled for rotation and supported by a frame work not shown. A pair of guides 24, 24' are located between pulleys 23 and 23' and define an intermediate pathway for belt 21. As shown in FIG. 1, guide 24' is springloaded by a pair of coil springs 25 and 25' to be biased outwardly in a direction away from guide 24. Though coil springs are shown, any other arrangement could be employed which applies an outward bias against guide 24'. In like fashion, pulley 231' is springloaded by a coil spring 26 so as to be biased outwardly in a direction away from pulley 23 to maintain tension on belt 21. Again, other biasing arrangements could be employed.

Belt 22 is received around pulleys 27, 27' with a single intermediate guide structure 28 located therebetween and with opposite edges 28' and 28" serving as guide surfaces to define the intermediate pathway for belt 22. Pulley 27' is springloaded by a coil spring 29 so as to be biased outwardly away from pulley 27 to maintain tension on belt 22.

With guide 24' spring loaded in a direction towards guide 28, the width of the passageway between belts 21 and 22 is variable. For example, a substrate 10 having a particular thickness passing between belts 21 and 22 will act against the biasing force of coil springs 25 and 25' moving guide 24' away from guide 28. At the same time, tension is maintained on belt 21 by pulley 23' and biasing force of springs 25 and 25' will ensure proper frictional contact between belts 21, 22 and substrate 10. As such, substrates varying in thickness may be driven by belts 21 and 22 for proper presentation to stripping section 50 to be described hereinafter.

Sheet 12 emerges from control feed section 20 and enters film stripping area or section 50. In film stripping area 50 the present invention provides apparatus for removal of film from one or both sides of a sheet. Since films or covers are normally provided on both bottom and top surfaces of a sheet, the invention is described herein for such. In film stripping area 50, there are air nozzle systems generally 30, 30', driven rolls 47, 47' and suction systems generally 45, 45'. Apparatus on one side of the sheet passageway through stripping area 50 is a mirror image of that on an opposite side of the passageway, wherefore only one side will be specifically described, with numbers bearing a prime representing the opposite structure.

Figure 2:
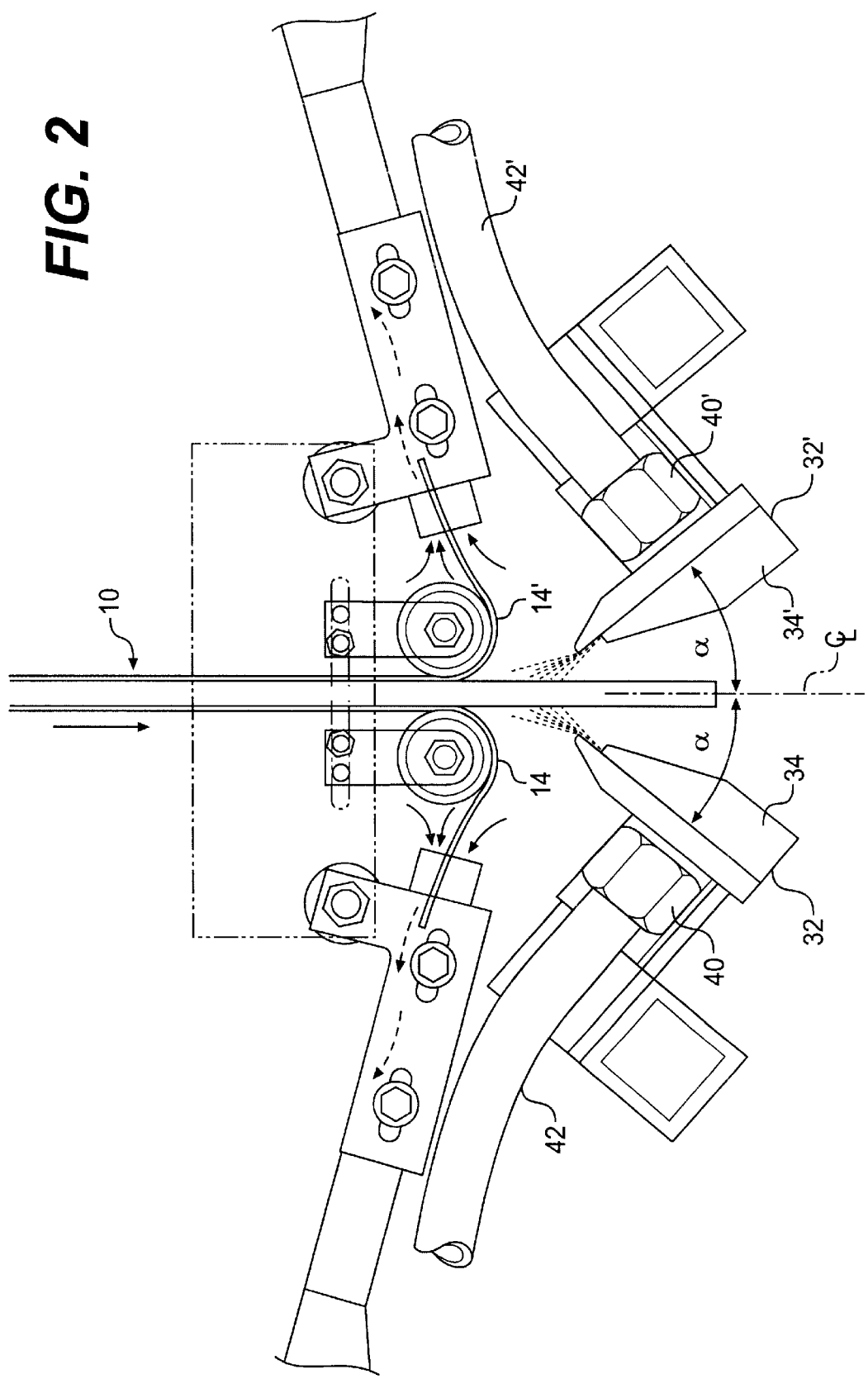
FIG. 2 is an enlarged top view of the film stripping area of apparatus according to the present invention as illustrated in FIG. 1.
Figure 3:
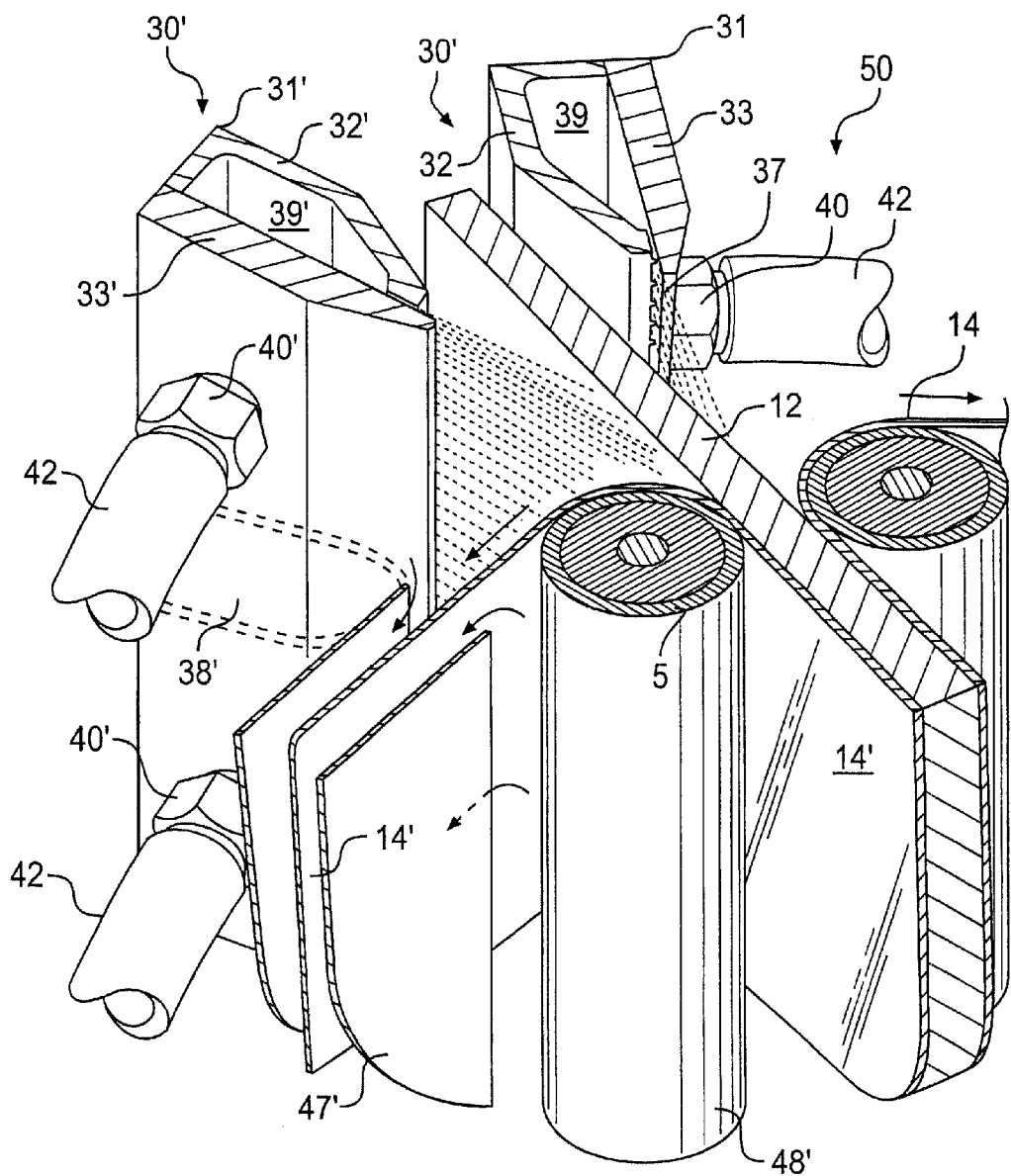
FIG. 3 is a further detailed view in partial cross section of the stripping area according to a preferred embodiment of apparatus according to the present invention as illustrated in FIG. 1, shown in perspective and with protective film in the process of removal.
Figure 4:
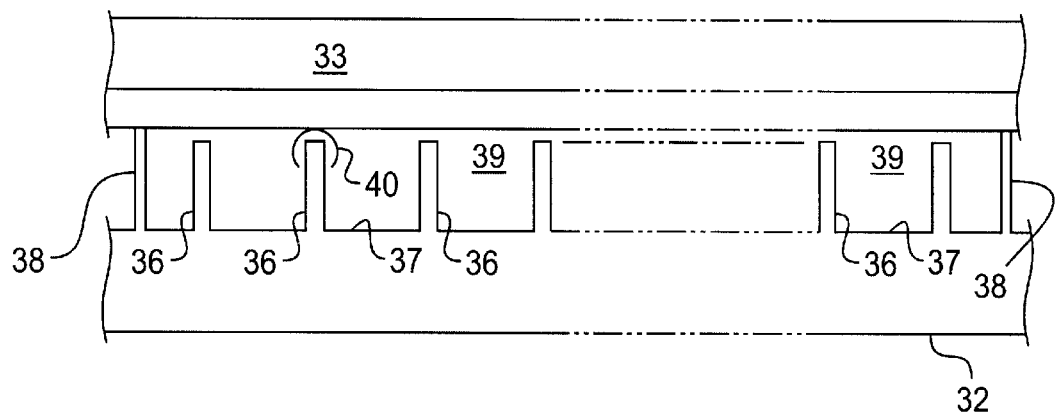
FIG. 4 is a partial frontal view of air nozzles according to the present invention.

Air nozzle system 30 which is best shown in FIGS. 3 and 4 includes an elongated nozzle housing 31 which forms a plurality of plenum chambers 39 separated by walls 38 and with each plenum chamber defining a plurality of nozzle openings 37. Structurally, housing 31 includes a generally U-shaped top wall 32 with a bottom wall 33 secured thereto, and with end walls 34. Bottom wall 33 includes a plurality of spaced protrusions 36 that define nozzle openings 37 therebetween. Each plenum chamber 39 has a coupling 40 for securement of an air hose or the like 42 thereto through which air is supplied to each plenum chamber 39. Housing 31 is located to cause air exiting nozzles 37 to impinge on film covers 14 passing thereby at an angle α from about 35 to about 45 degrees, and preferably about 40 degrees. (See FIG. 2). Nozzle housing 31 is sufficient in length to act on the full width of a substrate 10 passing thereby.

Figure 5:
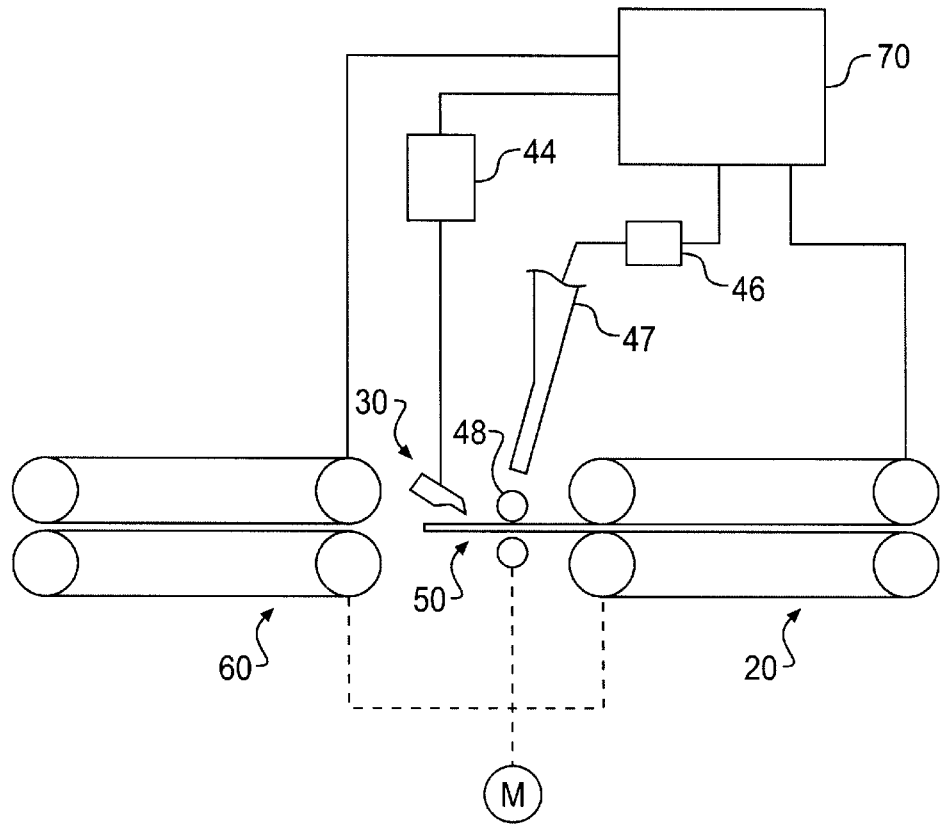
FIG. 5 is a schematic diagram of a control system for apparatus according to the present invention.

Air is supplied to air hoses 42 at a predetermined pressure in a range of from about 75 to about 150 pounds per square inch, preferably about 100 pounds per square inch from a conventional source of pressurized air 44 (See FIG. 5). Controls 70 are associated with the air source 44 to cause same to operate for a predetermined duration at predetermined intervals.

Adjacent air nozzle system 30 is a suction system generally 45. Suction system 45 includes an air duct 46, the outer face end of which is positioned closely proximate to nozzles 37. A source of suction such as a blower 47 (See FIG. 5) is operatively associated with duct 46 and generates suction therein for transport of film coverings 14 after they have been stripped from sheets 12.

Located closely adjacent nozzle system 30 and duct 47 is a roll 48 which is journaled for rotation in a framework (not shown). Roll 48 is driven by a motor M, preferably a variable speed motor, which also preferably drives conveyors of conveyor assemblies 20, 60. Though adjustable to accommodate different substrates, roll 48 in one arrangement is located about three-fourths inch from nozzles 37 and the entrance to duct 46. Roll 48 is positioned to receive, hold and transport film covers 14 to duct 47 where film cover 14 comes under the influence of suction in duct 47 and is transported thereby as cover 14 leaves roll 48. Roll 48 may be fully covered with friction surfaces with respect to film cover 14 such that film 14 becomes lightly attached to roll 48. However, any other arrangement may be provided for the surface of roll 48 such as a plurality of bands, o-rings or the like which will hold film 14 for stripping and for presentation to suction duct 47. Typically, a rubber type-surface will afford adequate holding power for removal of film 14 from substrate 12, and for release of film 14 to the force of suction. Further, a pair of rolls may be used which define a nip therebetween through which film cover 14 passes and is held thereby.

Downstream of film stripping area 50 is discharge conveyor section 60 for transport of substrate 12 away from stripping area 50 after film(s) 14 has been removed. Conveyor section 60 may be like feed section 20 or otherwise so long as sheet 12 may be transported thereby.

Operation of apparatus according to the present invention will now be described in detail. A sheet 12 with a film cover 14 on both sides is supplied to the space between conveyor belts 21, 22. Belts 21, 22 receive sheet 12 with belt 21 holding sheet 12 against belt 22 by the force of springs 25, 25'. Successive sheets 12 may then be fed to and handled by belts 21, 22.

Sheet 12 exits belts 21, 22 continuing along the same path and comes under the influence of air knives or nozzles 30 that at least partially lift a leading edge portion of film 14 from the affected side of sheet 12. Air under a pressure of about 75 to about 150 pounds per square inch impinges on film 14 at an angle and in a range of from about 35 to about 45 degrees. Preferably, air flow against sheet 10 is intermittent which conserves air, lessens noise and provides a series of sudden starts of a removal action. Preferably, air at about 100 pounds per square inch spurts in duration of about 2 seconds at about 5 second intervals against sheets 12 at an angle of about 40 degrees. The front leading edge portion of film 14 is thereby lifted from sheet 12 and forced against the outer surface of roll 48 which is rotating in a direction away from the path of travel for sheet 10 (clockwise). In a preferred arrangement, as noted above, roll 48 is located approximately equi-distant from duct 47 and nozzles 37, in one setting about three-fourths inch from each. Film 14 frictionally adheres to the surface of roll 48, and rotation of roll 48 thus assists in lifting film 14 from the moving sheet 12. Air blasts continue against sheet 12 and film 14, now generally at the junction, where film 14 and sheet 12 meet, also assisting in the stripping action.

As roll 48 rotates with film 14 in engagement therewith, film 14 is presented to the open end of suction duct 47 where the force of suction within duct 47 now lifts the leading edge of film 14 from roll 48. As roll 48 continues to present film 14 to duct 47, suction within duct 47 continues to act on film 14 continuously removing same from roll 48. Once film 14 has been totally removed from sheet 12 and roll 48, the now free film 14 is transported by the force of suction through duct 47 to a waste collector (not shown).

As sheet 12 passes through film stripping area 50, and after film 14 has been removed, sheet 12 is received by discharge conveyor 60 and is transported away for use in fabrication as intended.

Using apparatus of the present invention for stripping film from a substrate in a most preferred arrangement, there is coordination between speed of movement of sheets 10, the angle of air nozzles 30, the duration and intervals of air blasts from nozzles 30 and the proximity of roll 48 and duct 47 to individual nozzles 37. Proper control of these mentioned parameters permits efficient film removal. As shown in FIG. 5, a suitable, conventional program controller 70 is employed for controlling air pressure and supply to nozzles 30. In a preferred arrangement, substrate 10 is transported by the conveyors in sections 20 and 60 at a common rate. Air is delivered from nozzle system 30 at an angle of about 40 degrees in 2 second blasts every 5 seconds at about 100 pounds per square inch. Film covers 14 are thereby separated partially from sheets 12 and are blown against roll 48 located about three-fourths inches away. Suction force within duct 47 is generated by an airblower 46 or the like. With this preferred arrangement, films 14 may be efficiently continuously removed from sheets 12.

While particular embodiments of the invention have been described and shown, it will be understood by those of ordinary skill in the art that the present invention is not limited thereto since many modifications may be made. Therefore, it is contemplated by the present application to cover any and all such embodiments that may fall within the scope of the invention and the appended claims.

What is claimed is:

1. Apparatus for removing a flexible cover from a planar surface of a sheet comprising:

a conveyor arrangement for engaging and moving a sheet having a protective cover on at least one side of same along a predetermined path;

an air nozzle system located along said path for said sheet and being disposed at a predetermined angular relationship with respect to a sheet passing along said path, for directing gas under pressure against said flexible cover for at least partial dislodgement of same from said side of said sheet;

a driven roll located proximate said air nozzle system and said path, said roll having a surface for receiving and holding a portion of a cover dislodged from said surface for further removal of same as said sheet passes thereby; and a suction system located adjacent said roll for receiving said cover from said roll and transporting said cover away.

2. Apparatus as defined in claim 1 wherein said conveyor arrangement includes two opposed belt conveyors positioned to receive said sheet therebetween.

3. Apparatus as defined in claim 2 wherein at least one of said belt conveyors is adjustable relative to the other to permit sheets of different thickness to be received therebetween.

4. Apparatus as defined in claim 3 wherein one of said belt conveyors is fixed and the other of said belt conveyors includes a spring loaded support plate that biases said belt conveyor against a sheet passing thereby.

5. Apparatus as defined in claim 1 wherein said roll is between said air nozzle system and said suction system, said roll assisting in removal of said cover from said sheet and positioning a portion of said cover at said suction system where said suction system takes control over said cover as said cover is released from said roll.

6. Apparatus as defined in claim 1 wherein said air nozzle system is at an angle with respect to said path to provide air against said cover at an angle in a range of from about 35 to about 45 degrees.

7. Apparatus as defined in claim 6 wherein said air nozzle system includes a plurality of air chambers and nozzles in a side by side arrangement, each chamber being in communication with a source of air.

8. Apparatus as defined in claim 1 comprising further controls for said air nozzle system, said suction system, said roll and said conveyor assemblies for coordinating operation of each for removal of said cover.

9. Apparatus as defined in claim 1 wherein said air nozzle system further includes a source of pressurized air and controls for said air source to deliver air under pressure through said nozzle intermittently.

10. Apparatus as defined in claim 9 wherein said air is supplied to said nozzles at predetermined intervals, and for predetermined length of time.

11. Apparatus as defined in claim 1 comprising further a second conveyor arrangement for transport of said sheets away from said air nozzle system after said cover has been removed.

12. Apparatus for removal of a cover from a planar sheet comprising:
   a pair of opposed belt conveyors defining a path of travel for a sheet therebetween;
   an air nozzle system located along a continuation of said path of travel for said sheet, said air nozzle system being positioned to supply air under pressure against a sheet passing thereby at an angle in a range of from about 35 to about 45 degrees for dislodgement of a portion of said cover from said sheet;
   a driven roll located adjacent said path and said air nozzle system, said roll having an outer surface over at least a portion of same for adherence of cover portions thereto so that rotation of said roll assists in removal of said cover from said sheet;
   a suction conduit located to present an open end of same adjacent said driven roll whereby cover material being lifted from said sheet by said roll is presented to the effect of suction in said conduit.

13. Apparatus as defined in claim 12 wherein the outer surface of said roll develops a holding power with respect to said cover adequate to assist in removal of said cover from said sheet.

14. Apparatus as defined in claim 12 wherein said air nozzle system is positioned to supply air against said sheet at an angle of about 40 degrees with respect to said path of travel.

15. Apparatus as defined in claim 12 wherein said roll and said suction conduit are located in advance of said air nozzle system along said path.

16. Apparatus as defined in claim 12 wherein each one of said air nozzle system, said driven roll and said suction conduit are located on both sides of said path of travel for removal of a cover from opposite sides of said sheet.

17. Apparatus as defined in claim 12 comprising further a discharge conveyor arrangement adjacent said air nozzle system for moving said sheet away after said cover has been removed therefrom.

18. Apparatus for removing protective cover from a planar sheet comprising:
   an infeed conveyor arrangement for holding a sheet in a vertical disposition and transporting same along an intended path of travel;
   an air nozzle assembly located along said path of travel downstream from said conveyor arrangement, said assembly including a plurality of air nozzles disposed to supply air at an angle with respect to said path of travel in a range of from about 35 to about 45 degrees;
   a source of air under pressure in communication with each air nozzle;
   a suction conduit positioned along said path of travel adjacent said air nozzle system for receiving protective cover removed from said sheet;
   a source for generating suction in said conduit;
   a driven roll located between said air nozzle system and said suction conduit at a position where a cover portion lifted by said air nozzles engages said roll and said roll delivers said cover to said suction conduit; and
   a second conveyor arrangement for transporting said sheet after said protective cover has been at least partially removed therefrom.

19. Apparatus as defined in claim 18 comprising further a second said air nozzle assembly, driven roll and suction conduit located on an opposite side of said path.

20. Apparatus as defined in claim 18 wherein said air nozzles are disposed with respect to said path at an angle of about 40 degrees.

21. Apparatus as defined in claim 18 wherein said infeed conveyor arrangement includes two opposing belt conveyors defining said path of travel therebetween.

22. A method of removing a cover from a planar sheet comprising the steps of:
   transporting a sheet with a protective cover thereon along an intended path of travel;
   directing air under pressure at a predetermined angle with respect to said path against said cover to dislodge a portion of said cover from said sheet;
   engaging a portion of said cover dislodged from said sheet with a driven roll and continuing gradual removal of said cover; and
   presenting said dislodged portion of said cover to the effects of a source of suction whereby said force of suction is adequate to hold said portion of said cover and transport same away after said cover is completely removed from said sheet.

23. A method as defined in claim 22 wherein air under pressure is intermittently directed at said cover for a predetermined period of time during removal of said cover.

24. A method as defined in claim 22 wherein said sheet is transported in a vertical disposition.

25. A method as defined in claim 22 wherein like operations are conducted on opposite sides of said sheet for removal of covers from both sides of a sheet.

26. A method as defined in claim 22 wherein said air under pressure impinges on said cover at an angle in a range of from about 35 degrees to about 45 degrees with respect to said path of travel.

27. A method as defined in claim 22 wherein said air is at a pressure in a range of from about 75 to about 150 pounds per square inch.

* * * * *